No. 890,895. PATENTED JUNE 16, 1908.
C. FÉRY.
PYROMETER.
APPLICATION FILED APR. 1, 1907.

3 SHEETS—SHEET 1.

Witnesses:
Elizabeth Griffith
Thomas Durant

Inventor:
Charles Féry,
by Church & Church
his Attys

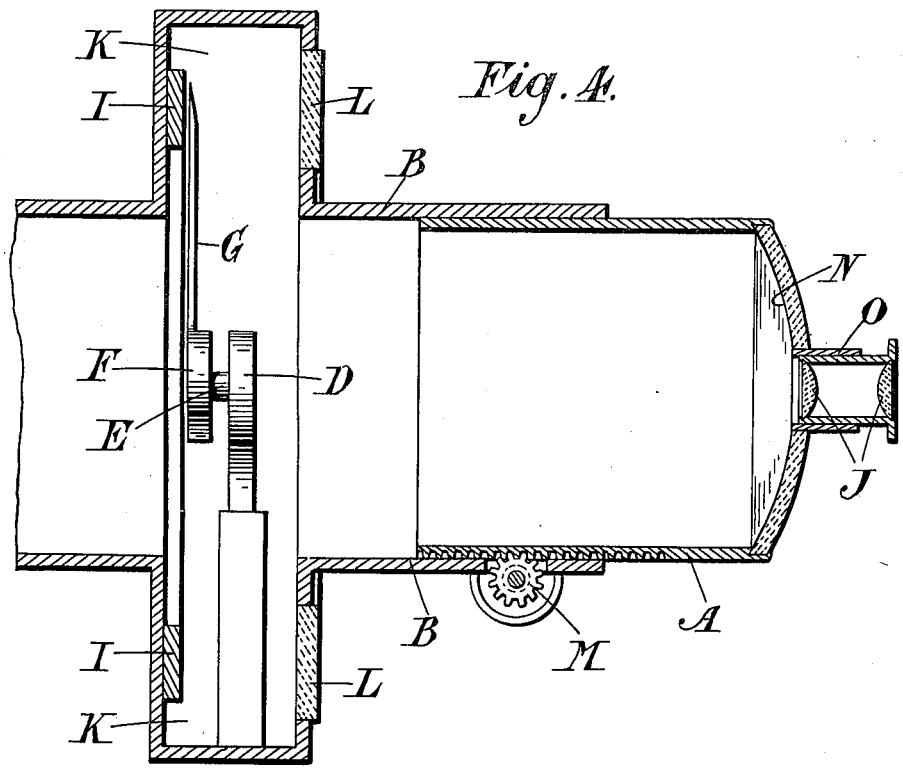

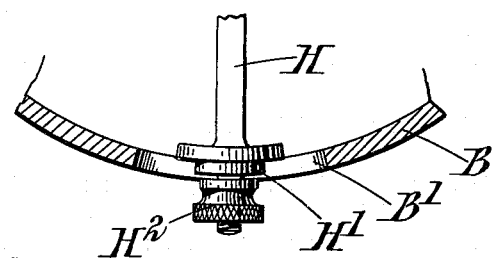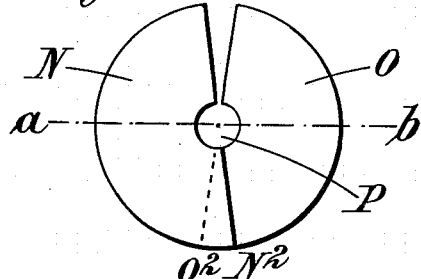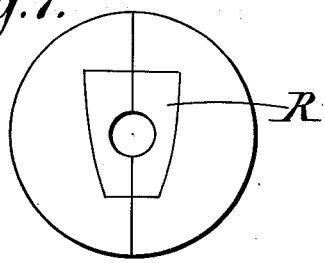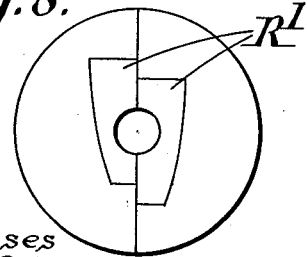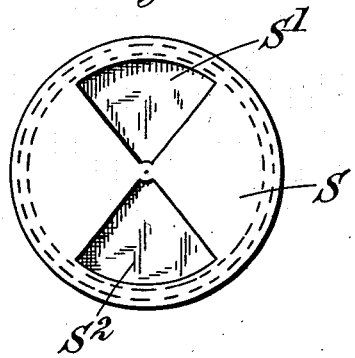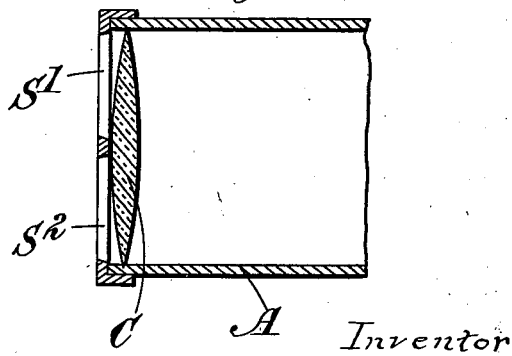

UNITED STATES PATENT OFFICE.

CHARLES FÉRY, OF PARIS, FRANCE.

PYROMETER.

No. 890,895.     Specification of Letters Patent.     Patented June 16, 1908.

Application filed April 1, 1907. Serial No. 365,774.

*To all whom it may concern:*

Be it known that I, CHARLES FÉRY, a citizen of the French Republic, residing at Paris, in France, have invented certain new and useful Improvements in Pyrometers, of which the following is a specification.

This invention relates to pyrometers or temperature-measuring devices which utilize the radiant energy emitted by a hot body as a basis for the measurement of the temperature of that body.

According to this invention radiation proceeding from a hot body is focused by the action of a suitable member such as a convex lens or concave mirror upon an expansible body, and means are provided for indicating the amount of the expansion of such body which is a measure of the temperature of the hot body. Thus a pyrometer according to this invention is complete in itself without the use of auxiliary apparatus. The indicating means are preferably such that the expansion of the body is made apparent upon a magnified scale; for instance, a light pointer may be employed, or one of the usual methods of magnifying motion by means of a beam of light on a scale.

The body which expands when heated by the radiation from the hot body is preferably of metal; for example, two thin strips of dissimilar metals may be soldered together and formed into a flat spiral of the kind generally known as Breguet's spiral. Such a spiral either becomes partly untwisted or twists up further when its temperature is raised.

Figure 1:
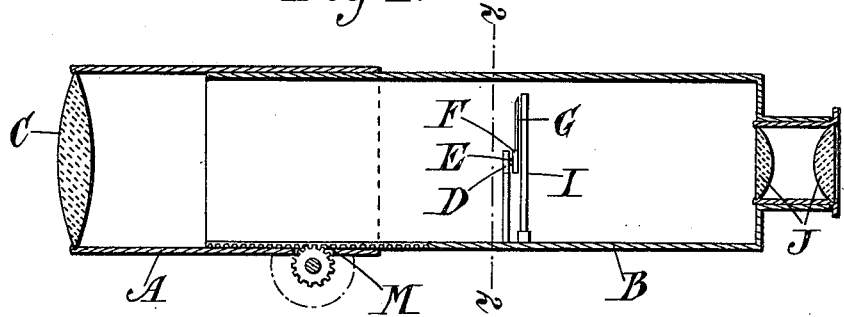
Figure 3:
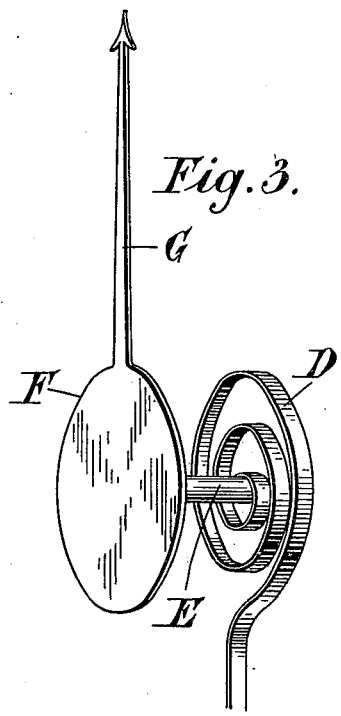
Figure 2:
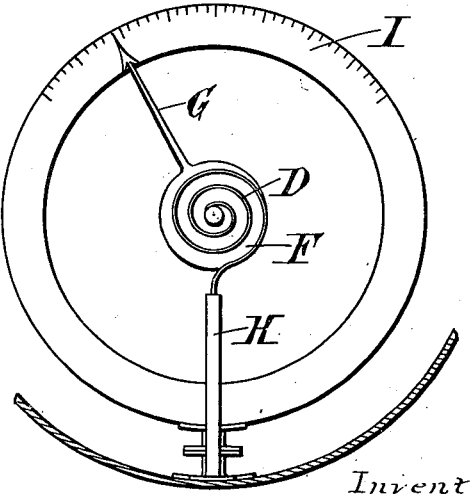

In the accompanying drawings, Figure 1 is a longitudinal section of one form of pyrometer according to this invention; Fig. 2 is a section on the line 2—2 of Fig. 1 to an enlarged scale; Fig. 3 is a perspective view of the strip and members attached thereto, and Fig. 4 is a longitudinal section of part of a modified form of apparatus also according to this invention. Fig. 5 is a sectional view of part of the apparatus showing an adjusting device; Figs. 6, 7 and 8 illustrate diagrammatically means for rendering visible any want of accuracy in the focusing; and Figs. 9 and 10 are respectively an elevation and a part longitudinal section showing a sector diaphragm.

With reference first to Fig. 1, A and B are cylindrical tubes forming the body of a telescope and capable of sliding one within the other for the purpose of adjustment of focus through the action of a rack and pinion M.

The front tube A carries a lens C at the conjugate focus whereof there is a body whose temperature is to be measured.

At the second conjugate focus is a multimetallic spiral strip D of the kind hereinbefore mentioned, consisting of two metals unequally expansible, such as platinum and silver. The spiral D is preferably very minute so that it is capable of being well covered by the image of a body of moderate dimensions. For example, dimensions which have in practice been found suitable for the spiral are as follows—The bimetallic strip from which the spiral is to be formed has a length of about 1 cm., a breadth of 1mm., and a thickness of 0.02 mm.

The spiral D is coated with a substance such as lamp black which absorbs radiation falling upon it. It has its inner extremity soldered to a small rod E of metal such as silver or copper having a high conductivity for heat, and this rod is in turn fixed to a plate F to which is attached an index or pointer G. The plate F is blackened on the side presented to the spiral D and brightly polished on the opposite side. The radiation which penetrates between the turns of the spiral D is thus received either by the turns or by the plate F which imparts by conduction to the spiral.

This plate may for convenience be termed a screen, although it has a dual function for it not only receives the rays which pass through the field of the expansible body, absorbs the same and transmits the heat by conduction to the body, but it also screens the body from direct rays as in Fig. 4 and from rays reflected from the rear of the casing, as in Fig. 1. The screen should be of an area approximately the same as the area of the expansible body and located on the side of the body remote from the focusing means in order that the body may as far as possible be acted on directly by the focused rays.

The outer extremity of the spiral is firmly attached to a support H preferably of a substance having a low thermal conductivity, for example, German silver. The object of mounting the spiral in this way is to secure under given radiation conditions, the greatest possible rise of temperature.

The index G can move over an arc I which is suitably graduated and which thus indicates the temperature of the spiral and enables a calculation of the temperature of the hot body to be made in accordance with the known laws of radiation. It is preferred to graduate the arc I so that the temperature of the hot body under examination is read off directly without the need for calculation. For the purpose of effecting such a graduation of the arc, substances having known melting points may be made use of, or the pyrometer may be compared with a standard pyrometer. The apparatus is completed by an eye-piece J and has thus the form of a telescope. By looking through the eye-piece, the observer is enabled to judge when the instrument is correctly sighted and focused, and at the same time to read off the required temperature upon the graduated arc.

In order to eliminate errors which might otherwise arise from changes in the temperature of the apparatus as a whole, an adjustment is provided whereby a small displacement can be given to the graduated arc I. The observer is thus able to insure that when no appreciable radiant energy enters the telescope, the reading of the index G upon the arc I is neither too high nor too low. Or instead of making the arc I adjustable, the support carrying the index G may be adjustable. An adjustment of this nature is illustrated by way of example in Fig. 5, where the support H carrying the index G or arc I is shown provided with a feather $H^1$ working in a slot $B^1$ in the tube B. A screw is formed at the extremity of the support and furnished with a nut $H^2$ which can be tightened up to clamp the support H at any given point in the slot $B^1$. Alternatively, instead of the index G and arc I being observed from the eye-piece J, the index may be made longer so as to be read against a graduated arc of correspondingly greater radius. An example of this construction is illustrated in Fig. 4 of the drawings where the tube B of the body of the apparatus is provided with a chamber K for the accommodation of the pointer G and arc I. Some portion of the chamber is made of glass as at L, so that the scale-reading indicated by the pointer G can be readily seen. This construction in Fig. 4 also illustrates the employment of a concave mirror N instead of the convex lens C. The rack and pinion M are provided, as in the construction shown in Fig. 1, and the eye-piece J mounted in a small draw tube O, is placed in an opening at the center of the concave mirror.

Although the expansible body has been described as in the form of a bimetallic strip, it is to be understood that any suitable expansion device having a receptive or sensitive portion of sufficiently small dimensions and capable of indicating temperature-changes upon a suitably open scale may be employed. Further, the apparatus may be provided with a sector diaphragm or with devices for rendering any want of accuracy in the focus readily visible; such features are known in the art and do not form in themselves part of the present invention, however, for the sake of clearness they are illustrated diagrammatically in Figs. 6 to 10 of the accompanying drawings.

Fig. 6 illustrates a device for rendering readily visible a want of accuracy in the focusing. Two pieces of plane mirror N and O are arranged nearly but not quite in the same plane, the line in which their planes intersect being the line $a$—$b$ which is perpendicular to the edges $N^1 N^2$ and $O^1 O^2$. These mirrors N and O are placed as nearly as possible in the plane where the image is to be formed, the bimetallic strips, or other expansion device, occupying the central space P where the mirrors are cleared away so as to leave an aperture. Light reaching the mirrors N O is reflected back into the eye piece J, Fig. 1, and when the object viewed is not focused in the plane approximately common to the two mirrors images seen by reflection in those mirrors, instead of blending together to form an unbroken image, as at R in Fig. 7, appear displaced as at $R^1$ in Fig. 8.

Figs. 9 and 10 show a sector diaphragm used in conjunction with a pyrometer of the type shown in Fig. 1 of the drawings. In front of the lens C is a diaphragm S having sector-like apertures $S^1 S^2$. The radiations entering the instrument are reduced, the amount of such radiations being proportional to the angular width of the apertures $S^1 S^2$.

As before intimated, the proportions of the exposed field of the expansible body and the image formed at the conjugate focus should be such that the image always covers the exposed field of the expansible body even when the object the temperature of which is to be measured is a relatively great distance away, for it is only when such relation exists that a uniformity of the heating of the expansible body can be effected and a correct temperature reading secured without regard to the distance of the heated object, thus in accordance with well known laws and with proper focusing the image of a near object being large, a smaller proportion of the rays emanating therefrom will be effective in heating the expansible body, and as the distance of the object increases the image grows smaller and an increased proportion of the rays are concentrated in the field of the expansible body and are effective in heating the same.

What I claim as my invention and desire to secure by Letters Patent is—

1. A self contained portable pyrometer utilizing for the measurement of temperature the heating effect of the focused radiation emitted by a hot object, the combination with a casing, means for focusing the radiation entering at one end of the casing, an eye piece through which the position of the focus may be determined, a body formed of metals having different coefficients of expansion located at the focus and exposed to the focused radiation, and an indicator mechanically connected for operation by the expansion and contraction of said body, said body having a field exposed to the radiation, of less area than the area of the image of the hot object when the radiation is focused on the body.

2. In a pyrometer utilizing for the measurement of the temperature the heating effect of the focused radiation emitted by a hot object, the combination with means for focusing the rays of radiant energy, a body formed of metals having different coefficients of expansion located at the focus of the rays, an indicator mechanically connected for operation by the expansion and contraction of said body, and means whereby the focused rays passing through the field in which the body is exposed are absorbed and transmitted to the body by conduction.

3. In a pyrometer utilizing for the measurement of temperature the heating effect of the focused radiation emitted by a hot object, the combination with means for focusing the rays of radiant energy, a shield located at the focus of the rays and having one absorbent face and a temperature indicating device connected with and heated by conduction from said shield.

4. In a pyrometer utilizing for the measurement of temperature the heating effect of the focused radiation emitted by a hot object, the combination with means for focusing the rays of radiant energy, a shield located at the focus of the rays and having one face absorbent and the other reflecting, and a temperature indicating device associated with and screened by said shield from the action of rays other than those concentrated in the field of the indicating device.

5. In a pyrometer utilizing for the measurement of temperature the heating effect of this focused radiation emitted by a hot object, the combination with means for focusing the rays of radiant energy, an expansible body located at the focus of the rays, an indicator controlled thereby, and a shield located in proximity to the expansible body on the side thereof removed from the focusing means, said shield having an area of approximately the area of the expansible body.

6. In a pyrometer utilizing for the measurement of temperature the heating effect of the focused radiation emitted by a hot body, the combination with a casing, a focusing element carried at one end of said casing, a multimetallic spiral strip within said casing, a pointer within said casing operatively connected with the strip, a scale upon which the movement of the pointer is indicated and means for adjusting said pointer and scale relatively to each other; substantially as described.

7. In a pyrometer utilizing for the measurement of temperature the heating effect of the focused radiation emitted by a hot body, the combination of a concave mirror, a multimetallic spiral strip, a fixed support whereto one extremity of the spiral strip is attached, a short metal rod attached to the other extremity of the spiral strip, a metal plate mounted on the rod approximately parallel to the plane of the spiral, a pointer attached to the metal plate, and a scale upon which the movement of the pointer is indicated.

In testimony whereof I have signed my name to this specification in the presence of two subscribing witnesses.

CHARLES FÉRY.

Witnesses:
   CHARLES PITAL,
   DEAN B. MASON.